(12) United States Patent
Zhao et al.

(10) Patent No.: US 10,550,222 B2
(45) Date of Patent: Feb. 4, 2020

(54) PBAT RESIN COMPOSITION

(71) Applicants: ZHUHAI WANGO CHEMICAL CO., LTD., Guangdong (CN); KINGFA SCI. & TECH. CO., LTD., Guangdong (CN); TIANJIN KINGFA NEW MATERIAL CO., LTD., Tianjin (CN)

(72) Inventors: Wei Zhao, Guangdong (CN); Renxu Yuan, Guangdong (CN); Meijun Tang, Guangdong (CN); Jian Jiao, Guangdong (CN); Kai Xiong, Guangdong (CN); Yuke Zhong, Guangdong (CN); Hui Yang, Guangdong (CN); Kaijin Mai, Guangdong (CN); Zhilong Guo, Guangdong (CN); Xueteng Dong, Guangdong (CN); Xiangbin Zeng, Guangdong (CN)

(73) Assignees: Zhuhai Wango Chemical Co., Ltd., Zhuhai (CN); Kingfa Sci. & Tech. Co., Ltd., Guangzhou (CN); Tianjin Kingfa New Material Co., Ltd., Tianjin (CN)

( * ) Notice: Subject to any disclaimer, the term of this patent is extended or adjusted under 35 U.S.C. 154(b) by 68 days.

(21) Appl. No.: 15/578,765

(22) PCT Filed: Dec. 15, 2016

(86) PCT No.: PCT/CN2016/109994
§ 371 (c)(1),
(2) Date: Dec. 1, 2017

(87) PCT Pub. No.: WO2017/121223
PCT Pub. Date: Jul. 20, 2017

(65) Prior Publication Data
US 2018/0215866 A1  Aug. 2, 2018

(51) Int. Cl.
C08G 63/183 (2006.01)
C08K 3/16 (2006.01)
C08K 3/22 (2006.01)
C08K 3/28 (2006.01)
C08K 3/30 (2006.01)
C08K 3/08 (2006.01)
C08L 67/02 (2006.01)

(52) U.S. Cl.
CPC .............. *C08G 63/183* (2013.01); *C08K 3/08* (2013.01); *C08K 3/16* (2013.01); *C08K 3/22* (2013.01); *C08K 3/28* (2013.01); *C08K 3/30* (2013.01); *C08L 67/02* (2013.01); *C08K 2003/2265* (2013.01); *C08K 2003/2268* (2013.01); *C08K 2003/2272* (2013.01); *C08K 2003/2275* (2013.01); *C08K 2003/3054* (2013.01); *C08K 2003/3072* (2013.01)

(58) Field of Classification Search
CPC .......... C08G 63/183; C08K 3/08; C08K 3/16;
C08K 3/22; C08K 3/28; C08K 3/30;
C08K 2003/2265; C08K 2003/2268;
C08K 2003/2272; C08K 2003/2275;
C08K 2003/3054; C08K 2003/3072;
C08L 67/02
USPC ........................................................ 524/435
See application file for complete search history.

(56) References Cited

U.S. PATENT DOCUMENTS

2003/0232958 A1  12/2003  Brunelle et al.

FOREIGN PATENT DOCUMENTS

CN  104109358 A  *  10/2014
CN  104262913 A  *  1/2015

OTHER PUBLICATIONS

Herrera et al., "Characterization and Degradation Behavior of Poly(butylene adipate-co-terephthalate)s," J. Polym. Sci., Part A, vol. 40, pp. 4141-4157. (Year: 2002).*
Alidedeoglu et al., "Evaluation of Biodegradable Copolyester Resins with Increased Green Content," ANTEC 2011, pp. 2666-2671. (Year: 2011).*
CN 104262913 A, machine translation, EPO Espacenet. (Year: 2015).*
Breulmann et al., "Modification of Biodegradable Polyester films: 5.5.1 Additives," Ullmann's Enc. Ind. Chem., vol. 29, p. 283. (Year: 2012).*
CN 104109358 A, machine translation, EPO Espacenet. (Year: 2014).*
International Search Report, State Intellectual Property Office of the P.R. China, dated Mar. 24, 2017.

* cited by examiner

*Primary Examiner* — Josephine L Chang
(74) *Attorney, Agent, or Firm* — Bay State IP, LLC

(57) ABSTRACT

The present invention discloses a PBAT resin composition comprising following components: (a) poly(butyleneadipate-co-terephthalate); (b) iron element; wherein, based on a total weight of the PBAT resin composition, a weight content of the iron element is 1 ppm-500 ppm. By adding iron-containing compounds into the composition and controlling the content of the iron element in a range of 1 ppm-500 ppm in the composition, a speed of reaction of aromatic structure in the PBAT resin under a hot and humid condition can be postponed, so that after the prepared PBAT resin composition is aged in boiling water for 24 hours and 48 hours, a variation of b-value is less than 2. The PBAT resin composition has obviously improved color stability in resistance to boiling water aging.

13 Claims, No Drawings

PBAT RESIN COMPOSITION

CROSS REFERENCE TO RELATED APPLICATION

This application is for entry into the U.S. National Phase under § 371 for International Application No. PCT/CN2016/109994 having an international filing date of Dec. 15, 2016, and from which priority is claimed under all applicable sections of Title of the United States Code including, but not limited to, Sections 120, 363, and 365(c), and which in turn claims priority under 35 USC 119 to Chinese Patent Application No. 201610018916.9 filed on Jan. 11, 2016.

TECHNICAL FIELD

The present invention relates to a field of modification of macromolecule materials, and specifically relates to a PBAT resin composition with good color stability.

BACKGROUND

Poly(butyleneadipate-co-terephthalate) (PBAT) is a copolymer of butylene adipate and butylene terephthalate, with characteristics of both PBA and PBT. Poly(butyleneadipate-co-terephthalate) (PBAT) contains a flexible aliphatic chain and a rigid aromatic chain, and thus it has high tenacity and high-temperature resistance. Owing to a presence of ester bond, the PBAT is enabled to have biodegradability, being a very active degradable material in the present biodegradable plastic research and one of the best degradable materials in market application.

However, PBAT also has following defects, for example, a PBAT resin turns yellow easily after soaking in hot water, having poor color stability in resistance to boiling water aging, affecting an appearance of the material.

The present invention surprisingly finds by research that in the PBAT resin, by adding an iron-containing compound, the prepared PBAT resin composition has obviously improved color stability in resistance to boiling water aging.

SUMMARY OF THE INVENTION

A purpose of the present invention is to provide a PBAT resin composition. The prepared PBAT resin composition has obviously improved color stability in resistance to boiling water aging by adding a trace amount of iron element into the composition.

The present invention is realized by following technical solutions:

a PBAT resin composition, characterized in that, it comprises following components:
(a) poly(butyleneadipate-co-terephthalate);
(b) iron element;

wherein, based on a total weight of the PBAT resin composition, a weight content of the iron element is 1 ppm-500 ppm.

The weight content of the iron element in the present invention is measured by a microwave digestion-ICP-OES method: 0.1 g of a smashed sample is weighed and put into a microwave digester; 5 ml of nitric acid is added so as to fully immerse the sample, followed by dropwise adding 1.0 ml of hydrogen peroxide slowly; after reacting for 2 minutes, the digester is covered and sealed with a lid and put into a microwave digestion furnace for digestion; after the furnace is cooled to room temperature, a solution in the digester is filtered with a 0.45 m-filter membrane followed by being transferred to a volumetric flask, and then is diluted to 50 ml with distilled water and measured by an ICP-OES.

The poly(butyleneadipate-co-terephthalate) (PBAT) resin in the prior art is a copolymer of butylene adipate and butylene terephthalate, which turns yellow easily after soaking in hot water. A main reason of turning yellow is that an aromatic structure thereof reacts in a hot and humid condition and generates a new conjugated structure. By research, the present invention finds that by adding an iron-containing compound into the PBAT resin and controlling the content of the iron element in a range of 1 ppm-500 ppm in the composition, a speed of reaction can be postponed, so that the prepared PBAT resin composition has obviously improved color stability in resistance to boiling water aging.

If the content of the iron element in the PBAT resin composition is too high, the PBAT resin presents a color of greyish-green, which affects an appearance. If the content of the iron element is too low, after the PBAT is aged in boiling water for 24 hours and 48 hours, the color changes severely and a variation of b-value is more than 2. Therefore, based on the total weight of the PBAT resin composition, the weight content of the iron element is preferably 10 ppm-250 ppm, more preferably 30 ppm-80 ppm.

The poly(butyleneadipate-co-terephthalate) (PBAT) resin in the present invention can be synthesized by conventional methods in the art.

Particularly, a weight content T % of butylene terephthalate unit in the poly(butyleneadipate-co-terephthalate) resin is 35 wt %-65 wt %. When T % is less than 35 wt %, an obtained product is too soft to be used. When T % is more than 65 wt %, the product is too hard to be used.

Particularly, a melt index of poly(butyleneadipate-co-terephthalate) resin is 8 g/10 min-25 g/10 min in a standard of GB/T 3682-2000 under a condition that temperature is 190° C. and a load is 5 kg. If the melt index is less than 8 g/10 min, energy consumption during processing is relatively high, resulting in being unable to make full use of a capacity of a molding equipment. If the melt index is higher than 25 g/10 min, the processing of product is unstable.

A route of acquiring the iron element in the present invention is by means of adding an iron-containing compound directly into the synthesized poly(butyleneadipate-co-terephthalate) (PBAT) resin.

The iron-containing compound is selected from one or more of the group consisting of ferric oxide, ferroferric oxide, ferrous oxide, ferrous sulfate, ferric sulfate, ammonium ferric sulfate, ammonium ferrous sulfate, ferrous nitrate, ferric nitrate, ferrous chloride, ferric chloride, ferric oxide and ferroferric oxide.

According to different needs of use, the PBAT resin composition of the present invention further comprises other promoters, such as antioxidant, light stabilizer, impact modifier, flame retardant, fluorescent brightener, lubricant, plasticizer, antistatic agent, release agent, pigment and the like. Based on 100 parts by weight of the PBAT resin, an addition of other promoters can be 0-10 parts by weight according to needs.

The antioxidant is selected from one or more of the group consisting of hindered amine antioxidant, hindered phenols antioxidant or phosphites antioxidant. It can be specifically listed as one of or a mixture of two or more of 1010, 168, 1076, 445 and 1098.

The light stabilizer is a hindered amine light stabilizer, specifically listed as one of, or a mixture of two or more of UV-944, UV-234, 770DF, 328 and 531.

The impact modifier is PTW or a block copolymer of styrene-ethylene/butylene-styrene (SEBS), or a mixture thereof.

The flame retardant is one of or a mixture of two or more of red phosphorus, OP1240 and OP1230.

The fluorescent brightener is bis(triazinylamino-stilbene) or titanium dioxide, or a mixture thereof.

The lubricant is one of or a mixture of two or more of talcum powder, ethylene bis stearamide (EBS), erucamide, zinc stearate and silicone oil.

The plasticizer is one of or a mixture of two or more of glycerol, citric acid, tributyl citrate, epoxidized soybean oil and the like.

The antistatic agent is a permanent antistatic agent, specifically listed as one of or a mixture of two or more of PELESTAT-230, PELESTAT-6500 and SUNNICO ASA-2500.

The release agent is one of or a mixture of two or more of silicone oil, paraffin, white mineral oil and Vaseline.

The pigment is one of or a mixture of two or more of carbon black, black masterbatch, titanium dioxide, zinc sulfide, phthalocyanine blue and fluorescent orange.

Compared to the prior art, the present invention has following beneficial effects:

By adding the iron-containing compound into the PBAT resin and controlling the content of the iron element in a range of 1 ppm-500 ppm in the composition, a speed of reaction of aromatic structure in the PBAT resin under a hot and humid condition can be postponed, so that after the prepared PBAT resin composition is aged in boiling water for 24 hours and 48 hours, the variation of b-value is less than 2. The PBAT resin composition has obviously improved color stability in resistance to boiling water aging.

DETAILED DESCRIPTION OF THE PREFERRED EMBODIMENT

The present invention will be further described below by way of specific implementations, and the following embodiments are preferred implementations of the present invention, but the implementations of the present invention are not limited by the following embodiments.

Iron-containing compounds used in the present invention are commercially available.

A synthesis method of a PBAT resin:

a metric amount of terephthalic acid and 1, 4-butylene glycol were put into a reaction kettle, with the temperature being increased to 220-240° C. for reaction until the terephthalic acid was completely reacted. A metric amount of adipic acid was put into the reaction kettle followed by the reaction being continued at 180-220° C. until the adipic acid was completely reacted. Suitable amounts of catalyst and stabilizer were added. A pressure inside the reaction kettle was decreased below 50 Pa within 30-60 minutes. The reaction was performed at 220-260° C. until a specified viscosity was reached, and then a stirring was stopped and high-purity nitrogen was injected to the reaction kettle. The PBAT resin was obtained by extruding the resin from the reaction kettle and prilling. By changing an addition of terephthalic acid and adipic acid, PBAT resins with different contents of butylene terephthalate unit can be obtained.

In particular, the content of butylene terephthalate unit was measured by $^1H$ NMR, with deuteriochloroform being a solvent and TMS being an interior standard. A result was calculated according to the following formula:

$$T\% = \frac{220 * S_{8.1}}{220 * S_{8.1} + 200 * S_{2.3}} * 100\%$$

wherein: T % represents the content of butylene terephthalate unit;

$S_{8.1}$ represents an absorption peak area at 8.1 ppm in a $^1H$ NMR spectrum;

$S_{2.3}$ represents an absorption peak area at 2.3 ppm in the $^1H$ NMR spectrum.

Embodiments 1-20 and Comparative Embodiments 1-2

According to formulas shown in Table 1, PBAT resin, iron-containing compounds and other promoters such as antioxidant 1010, erucamide, light stabilizer UV-944, impact modifier PTW, flame retardant OP1240, titanium dioxide as fluorescent brightener, talcum powder as lubricant, tributyl citrate as plasticizer, antistatic agent PELESTAT-230, silicone oil as release agent and carbon black 50L as pigment, were mixed evenly and put into a single screw extruder. After being extruded at 170° C.–210° C. and prilled, the compositions were obtained. Data of performance tests is shown in Table 1.

Performance Evaluation Method:

(1) color: spherical particles after prilling were employed and directly tested via a DC-P3 full-automatic colorimeter produced by Beijing Xingguang Color-Measurement Instrument Co., ltd.

(2) a weight content of the iron element was measured by following method: 0.1 g of a smashed sample was weighed and put into a microwave digester; 5 ml of nitric acid was added so as to fully immerse the sample, followed by dropwise adding 1.0 ml of hydrogen peroxide slowly; after reacting for 2 minutes, the digester was covered and sealed with a lid and put into a microwave digestion furnace for digestion; after the furnace was cooled to room temperature, a solution in the digester was filtered with a 0.45 μm-filter membrane followed by being transferred to a volumetric flask, and then was diluted to 50 ml with distilled water and measured via Agilent Technologies 700 Series ICP-OES.

TABLE 1

Ratio of each component and performance test results of Embodiments 1-20 and Comparative Embodiments 1-2

| | | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 | Embodiment 12 | Embodiment 13 |
|---|---|---|---|---|---|---|---|---|---|---|---|---|---|---|
| PBAT/Kg | | 100 | 100 | 100 | 100 | 100 | 100 | 100 | 100 | 100 | 100 | 100 | 100 | 100 |
| Content of butylene terephthalate unit in PBAT (T %) | | 65 | 35 | 60 | 40 | 55 | 45 | 50 | 52 | 53 | 51 | 54 | 49 | 50 |
| Melt index of PBAT (g/10 min) | | 8 | 9 | 13 | 25 | 9 | 14 | 18 | 20 | 16 | 15 | 12 | 23 | 16 |
| Iron-containing compound | Type | ferric oxide | ferroferric oxide | ferrous oxide | ferrous sulfate | ferric sulfate | ammonium ferric sulfate | ammonium ferric sulfate | ferrous nitrate | ferric nitrate | ferrous chloride | ferric chloride | ferric oxide | ferroferric oxide |
| | addition/g | 0.43 | 0.55 | 0.64 | 2.99 | 1.25 | 3.16 | 2.37 | 2.58 | 3.03 | 1.48 | 2.18 | 0.82 | 0.89 |
| Content of Fe (based on the whole compound) ppm | | 30 | 40 | 50 | 60 | 35 | 45 | 55 | 80 | 70 | 65 | 75 | 57 | 64 |
| Other promoters/Kg | Antioxidant 1010 | 1.5 | 1.5 | 1.5 | 1.5 | 1.5 | 1.5 | 0 | 1.5 | 0 | 1.5 | 1.5 | 0 | 1.5 |
| | erucamide | 1 | 1 | | 1 | | 3 | 0 | 2 | 0 | 0.5 | | 0 | 1 |
| | UV-944 | 1 | | | 1 | | | | | | 0.5 | 2 | | |
| | PTW | 1 | 1 | 1 | | | | | 0.5 | | | | | |
| | OP1 | | | 1 | | 0.5 | 0.5 | | | | | 0.5 | | |
| | 240 | | | | | | | | | | | | | |
| | titanium dioxide | | | | 1 | | | | 0.5 | | 1 | | | |
| | tributyl citrate | | | | | 0.5 | 0.5 | 0.5 | | | | | | 1 |
| | PELESTAT-230 | | | | | 2 | | | | | | 0.5 | | |
| | Carbon black 50L | | | | | | | | | | 1 | | | |
| b0 | | 11.28 | 8.84 | 13.53 | 8.84 | 7.1 | 9.35 | 9.94 | 7.02 | 10.64 | 9.18 | 13.56 | 12.16 | 12.93 |
| b24 | | 10.54 | 9.31 | 12.59 | 8.91 | 6.33 | 8.86 | 9.68 | 7.46 | 10.93 | 8.56 | 12.97 | 11.81 | 13.25 |
| b48 | | 10.52 | 9.62 | 12.78 | 8.63 | 7.88 | 8.41 | 9.73 | 7.79 | 11.38 | 8.36 | 12.62 | 11.37 | 13.62 |
| b0-b24 | | 0.74 | -0.47 | 0.94 | -0.07 | 0.77 | 0.49 | 0.26 | -0.44 | -0.29 | 0.62 | 0.59 | 0.35 | -0.32 |
| b0-b48 | | 0.76 | -0.78 | 0.75 | 0.21 | -0.78 | 0.94 | 0.21 | -0.77 | -0.74 | 0.82 | 0.94 | 0.79 | -0.69 |

TABLE 1-continued

Ratio of each component and performance test results of Embodiments 1-20 and Comparative Embodiments 1-2

|  | | Embodiment 14 | Embodiment 15 | Embodiment 16 | Embodiment 17 | Embodiment 18 | Embodiment 19 | Embodiment 20 | Comparative Embodiment 1 | Comparative Embodiment 2 |
|---|---|---|---|---|---|---|---|---|---|---|
| PBAT/Kg | | 100 | 100 | 100 | 100 | 100 | 100 | 100 | 100 | 100 |
| Content of butylene terephthalate unit in PBAT (T %) | | 50 | 54 | 57 | 51 | 52 | 56 | 53 | 50 | 54 |
| Melt index of PBAT (g/10 min) | | 10 | 8 | 18 | 16 | 21 | 14 | 10 | 8 | 25 |
| Iron-containing compound | Type | ferric oxide | ferroferric oxide | ferric oxide | ferric oxide | ferroferric oxide | ferric oxide | ferroferric oxide | ferric oxide | ferroferric oxide |
|  | addition/g | 0.28 | 1.52 | 2.27 | 3.41 | 0.11 | 5.68 | 6.43 | 0.007 | 8.29 |
| Content of Fe (based on the whole compound) ppm | | 20 | 110 | 160 | 240 | 8 | 400 | 500 | 0.5 | 600 |
| Other promoters/Kg | Antioxidant 1010 | 1.5 | 1.5 | 1.5 | 1.5 | 1.5 | 1.5 | 1.5 | 1.5 | 1.5 |
|  | erucamide | 3 | 3 | 3 | 3 | 3 | 3 | 3 | 3 | 3 |
| b0 | | 7.39 | 13.27 | 14.35 | 15.64 | 5.14 | 17.29 | 19.38 | 6.38 | 22.86 |
| b24 | | 8.52 | 12.04 | 13.23 | 14.48 | 6.78 | 18.81 | 17.69 | 8.69 | 25.78 |
| b48 | | 8.75 | 11.93 | 12.87 | 14.21 | 6.97 | 19.02 | 17.47 | 9.81 | 26.96 |
| b0-b24 | | -1.13 | 1.23 | 1.12 | 1.16 | -1.64 | -1.52 | 1.69 | -2.31 | -2.92 |
| b0-b48 | | -1.36 | 1.34 | 1.48 | 1.43 | -1.83 | -1.73 | 1.91 | -3.43 | -4.1 |

In particular, b0 represents a b-value before boiling water aging, b24 represents the b-value after boiling water aging for 24 hours, and b48 represents the b-value after boiling water aging for 48 hours. b0-b24 represents a difference value between the b-value before boiling water aging and the b-value after boiling water aging for 24 hours. b0-b48 represents a difference value between the b-value before boiling water aging and the b-value after boiling water aging for 48 hours. The smaller an absolute value of the difference value is, the better a color stability of the composition in resistance to boiling water aging can be.

It can be seen from Table 1 that, when the content of the iron element in the PBAT composition is 1-500 ppm, after the PBAT composition is aged in boiling water for 24 hours and 48 hours, a variation of b-value is less than 2. It indicates that the composition has good color stability in resistance to boiling water aging. When the content of the iron element is less than 1 ppm in Comparative Embodiment 1 and the content of the iron element is more than 500 ppm in Comparative Embodiment 2, the variation of b-value is more than 2. It indicates a relatively poor color stability of the composition in resistance to boiling water aging.

What is claimed:

1. A PBAT resin composition, characterized in that, it comprises following components:
   (a) poly(butyleneadipate-co-terephthalate);
   (b) an iron-containing compound;
   (c) at least one promoter selected from the group consisting of: a light stabilizer, an impact modifier, a flame retardant, a fluorescent brightener, a release agent and a pigment;
   wherein the weight content of iron element derived from the iron-containing compound is 1 ppm-500 ppm based on the total weight of the PBAT resin composition; and
   wherein the iron-containing compound is selected from one or more of the group consisting of ferroferric oxide, ferrous oxide, ferrous sulfate, ferric sulfate, ammonium ferric sulfate, ammonium ferrous sulfate, ferrous nitrate, ferric nitrate, ferrous chloride and ferric chloride.

2. The PBAT resin composition according to claim 1, wherein based on the total weight of the PBAT resin composition, the weight content of iron element is 10 ppm-250 ppm.

3. The PBAT resin composition according to claim 1, wherein based on the total weight of the PBAT resin composition, the weight content of iron element is 30 ppm-80 ppm.

4. The PBAT resin composition according to claim 1, wherein a weight content T % of butylene terephthalate unit in the poly(butyleneadipate-co-terephthalate) resin is 35 wt %-65 wt %.

5. The PBAT resin composition according to claim 1, wherein a melt index of the poly(butyleneadipate-co-terephthalate) resin is 8 g/10 min-25 g/10 min in a standard of GB/T 3682-2000 under a condition that temperature is 190° C. and a load is 5 kg.

6. The PBAT resin composition according to claim 1, wherein after the PBAT resin composition is aged in boiling water for 24 hours and 48 hours, a variation of b-value is less than 2.

7. The PBAT resin composition according to claim 2, wherein after the PBAT resin composition is aged in boiling water for 24 hours and 48 hours, a variation of b-value is less than 2.

8. The PBAT resin composition according to claim 4, wherein after the PBAT resin composition is aged in boiling water for 24 hours and 48 hours, a variation of b-value is less than 2.

9. The PBAT resin composition according to claim 5, wherein after the PBAT resin composition is aged in boiling water for 24 hours and 48 hours, a variation of b-value is less than 2.

10. The PBAT resin composition according to claim 9, wherein after the PBAT resin composition is aged in boiling water for 24 hours and 48 hours, a variation of b-value is less than 2.

11. The PBAT resin composition according to claim 1, wherein the fluorescent brightener is bis(triazinylaminostilbene) or titanium dioxide, or a mixture thereof.

12. The PBAT resin composition according to claim 1, wherein the pigment is one of or a mixture of two or more of carbon black, black masterbatch, titanium dioxide, zinc sulfide, phthalocyanine blue and fluorescent orange.

13. The PBAT resin composition according to claim 1, wherein the PBAT resin composition further comprises another promoter selected from the group consisting: an antioxidant, a lubricant, a plasticizer, and an antistatic agent.

* * * * *